US008889768B2

(12) United States Patent
von Benten et al.

(10) Patent No.: US 8,889,768 B2
(45) Date of Patent: Nov. 18, 2014

(54) LASER-TRANSPARENT PBT WITH ORGANIC ADDITIVES

(75) Inventors: Rebekka von Benten, Ludwigshafen (DE); Peter Eibeck, Speyer (DE); Walter Heckmann, Weinheim (DE); Jordan Kurikov, Mannheim (DE); Mariou Sorin Pulbere, Heidelberg (DE)

(73) Assignee: BASF SE, Ludwigshafen (DE)

( * ) Notice: Subject to any disclaimer, the term of this patent is extended or adjusted under 35 U.S.C. 154(b) by 15 days.

(21) Appl. No.: 13/157,965

(22) Filed: Jun. 10, 2011

(65) Prior Publication Data

US 2011/0306707 A1    Dec. 15, 2011

Related U.S. Application Data

(60) Provisional application No. 61/353,674, filed on Jun. 11, 2010.

(51) Int. Cl.
| | |
|---|---|
| *C08K 5/098* | (2006.01) |
| *C08K 5/45* | (2006.01) |
| *C08K 5/138* | (2006.01) |
| *C08K 5/3415* | (2006.01) |
| *C08K 5/3432* | (2006.01) |
| *C08K 5/42* | (2006.01) |
| *C08L 67/00* | (2006.01) |
| *C08K 5/00* | (2006.01) |

(52) U.S. Cl.
CPC .................................. *C08K 5/0008* (2013.01)
USPC ............... 524/84; 524/99; 524/104; 524/161; 524/327; 524/396; 156/272.8

(58) Field of Classification Search
CPC .............................. C08K 5/0008; C08L 67/02
USPC ...................... 524/396, 84, 99, 104, 161, 327; 156/272.8
See application file for complete search history.

(56) References Cited

U.S. PATENT DOCUMENTS

| | | | |
|---|---|---|---|
| 3,651,014 | A | 3/1972 | Witsiepe |
| 4,148,846 | A | 4/1979 | Owens et al. |
| 4,269,964 | A | 5/1981 | Freitag et al. |
| 4,393,178 | A | 7/1983 | Legras et al. |
| 4,584,360 | A | 4/1986 | Paul et al. |
| 4,732,949 | A | 3/1988 | Paul et al. |
| 4,771,109 | A | 9/1988 | Eichenauer et al. |
| 4,873,289 | A | 10/1989 | Lindner et al. |
| 4,882,381 | A | 11/1989 | Wittmann et al. |
| 5,010,135 | A | 4/1991 | Eckel et al. |
| 6,151,180 | A | 11/2000 | Bang |
| 2003/0130381 | A1 * | 7/2003 | Joachimi et al. ................. 524/88 |
| 2006/0281846 | A1 | 12/2006 | Hager et al. |

FOREIGN PATENT DOCUMENTS

| | | |
|---|---|---|
| DE | 2842005 A1 | 4/1980 |
| DE | 3334782 A1 | 10/1984 |
| DE | 35 06 472 A1 | 8/1986 |
| DE | 3725576 A1 | 2/1989 |
| DE | 3800603 A1 | 7/1989 |
| DE | 19916104 A1 | 10/1999 |
| DE | 10054859 A1 | 5/2002 |
| DE | 10330722 A1 | 2/2005 |
| DE | 10330722 A1 | 2/2005 |
| EP | 0 208 187 A2 | 1/1987 |
| EP | 235690 A2 | 9/1987 |
| EP | 0251732 A2 | 1/1988 |
| EP | 0319290 A2 | 6/1989 |
| EP | 0365916 A1 | 5/1990 |
| EP | 0711810 A1 | 5/1996 |
| EP | 1353986 A2 | 10/2003 |

(Continued)

OTHER PUBLICATIONS

Becker, F., et al., "Trends bei Serien-schweißverfahren," Kunststoffe, 1997, vol. 87, No. 11, pp. 1632-1640.

(Continued)

*Primary Examiner* — Kriellion Sanders
(74) *Attorney, Agent, or Firm* — Drinker Biddle & Reath LLP

(57) ABSTRACT

Use of thermoplastic molding compositions comprising, as essential components,
A) a polyester,
B) from 20 to 200 mmol/kg of polyester A) of at least one compound of the general formula (I)

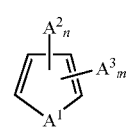

where
respectively independently at any position
-$A^1$- is —NR—, —O—, —S—, —CH=$A^4$- where R is H or $C_{1-6}$-alkyl, $A^4$ is N or CH
$A^2$ is COOX or OX, where X is Li, Na, K, Rb, Cs, Mg/2, Ca/2, Sr/2, Ba/2, Al/3
$A^3$ is $C_{1-6}$-alkyl, $C_{6-12}$-aryl, $O_{7-13}$-alkaryl, $C_{7-13}$-aralkyl, O—$C_{1-6}$-alkyl, O—$C_{6-12}$-aryl, O—$C_{7-13}$-alkaryl, O—$C_{7-13}$-aralkyl, COOX', OX', SX', $SO_3$X', where X' is H or X, S—$C_{1-6}$-alkyl, S—$C_{6-12}$-aryl, $NR_2$, halogen, $NO_2$,
n is an integer from 1 to 4, and
m is an integer from 0 to 4-n, where m=1, if $A^3$=$NO_2$,
with the proviso that the number of mmol is based on the group(s) COOX and OX and SX' where X'=X, to the extent that these are present in the compound of the general formula (I), and also moreover
C) from 0 to 230% by weight of further added substances, based on the weight of component A),
for producing laser-transparent moldings of any type.

7 Claims, No Drawings

(56) References Cited

FOREIGN PATENT DOCUMENTS

| | | |
|---|---|---|
| EP | 1722984 A1 | 11/2006 |
| EP | 2036952 A1 | 3/2009 |
| JP | 2004315805 A | 11/2004 |
| JP | 2005133087 A | 5/2005 |
| JP | 2007169358 A | 7/2007 |
| JP | 2007186584 A | 7/2007 |
| JP | 2008106217 A | 5/2008 |
| JP | 2009019134 A | 1/2009 |
| WO | WO-0238664 A2 | 5/2002 |

OTHER PUBLICATIONS

Gilmer, J. W., et al., "The Use of Sodium Salts as Nucleation Agents for Polyethylene Terephthalate With Minimal Molecular Weight Reduction," Polymer Engineering and Science, 1995, vol. 35, No. 17, pp. 1407-1412.

Hänsch, D., et al., "Harte und weiche Kunststoffe mit Diodenlaser verbinden," Kunststoffe, 1998, vol. 88, No. 2, pp. 210-212.

Mercier, J. P., "Nucleation in Polymer Crystallization: A Physical or a Chemical Mechanism?", Polymer Engineering and Science, 1990, vol. 30, No. 5, pp. 270-278.

Plastverarbeiter, "Berührungslos, schnell und sauber," Plastverarbeiter, 1999, vol. 50, No. 4, pp. 18-19.

Potente, H., et al., "Laser-Durchstrahlschweißen von PE-HD," Kunststoffe, 1997, vol. 87, No. 3, pp. 348-350.

Potente, H., et al., "Laserschweißen von Thermoplasten," Plastverarbeiter, 1995, vol. 48, No. 9, pp. 42-46.

Zhang, J., "Effective Nucleating Chemical Agents for the Crystallization of Poly(trimethylene terephthalate)," Journal of Applied Polymer Science, 2004, vol. 93, pp. 590-601.

U.S. Appl. No. 13/107,219, filed May 13, 2011, von Benten et al.
U.S. Appl. No. 13/408,380, filed Feb. 29, 2012, von Benten et al.
U.S. Appl. No. 13/408,352, filed Feb. 29, 2012, von Benten et al.
U.S. Appl. No. 13/408,397, filed Feb. 29, 2012, von Benten et al.
International Search Report from PCT/EP2011/059673 dated Nov. 8, 2011.

* cited by examiner

LASER-TRANSPARENT PBT WITH ORGANIC ADDITIVES

CROSS-REFERENCE TO RELATED APPLICATIONS

This application claims the benefit of U.S. Provisional Application 61/353,674 filed on Jun. 11, 2010, which is incorporated by reference.

BACKGROUND OF THE INVENTION

The invention relates to the use of thermoplastic molding compositions comprising
A) a polyester,
B) from 20 to 200 mmol/kg of polyester A) of at least one compound of the general formula (I)

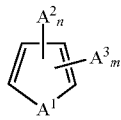

(I)

where
respectively independently at any position
-$A^1$- is —NR—, —O—, —S—, —CH=$A^4$- where R is H or $C_{1-6}$-alkyl, $A^4$ is N or CH
$A^2$ is COOX or OX, where X is Li, Na, K, Rb, Cs, Mg/2, Ca/2, Sr/2, Ba/2, Al/3
$A^3$ is $C_{1-6}$-alkyl, $C_{6-12}$-aryl, $C_{7-13}$-alkaryl, $C_{7-13}$-aralkyl, O—$C_{1-6}$-alkyl, O—$C_{6-12}$-aryl, O—$C_{7-13}$-alkaryl, O—$C_{7-13}$-aralkyl, COOX', OX', SX', $SO_3$X', where X' is H or X, S—$C_{1-6}$-alkyl, S—$C_{6-12}$-aryl, $NR_2$, halogen, $NO_2$,
n is an integer from 1 to 4, and
m is an integer from 0 to 4−n, where m=1, if $A^3$=$NO_2$,
with the proviso that the number of mmol is based on the group(s) COOX and OX and SX' where X'=X, to the extent that these are present in the compound of the general formula (I), and also moreover
C) from 0 to 230% by weight of further added substances, based on the weight of component A), for producing laser-transparent moldings of any type.

The invention further relates to the use of the laser-transparent moldings for producing moldings by means of laser transmission welding processes, to processes for producing moldings of this type, and also to the use of these in various application sectors.

Components B) of this type have been described by way of example in Polymer Engineering and Science 1990, BO (5), pp. 270 ff, and 1995, 35 (17), pp. 1407 ff, Journal of Appl. Pol. Sci. 2004, 93, pp. 590 ff, and also U.S. Pat. No. 4,393,178, and EP-A-0 251 732, as nucleators for compounded PET materials. The optical properties of the compounded materials were not studied.

There are various existing processes for the welding of plastics moldings (Kunststoffe 87, (1997), 11, 1632-1640). Precondition for a stable weld in the widely used heated-tool welding process and vibration welding process (e.g. for motor-vehicle intake manifolds) is adequate softening of the adherends in the contact zone prior to the actual connection step.

Laser transmission welding, in particular using diode lasers, has been increasingly widely used recently as a method providing an alternative to vibration welding and heated-tool welding.

The technical literature describes fundamental principles of laser transmission welding (Kunststoffe 87, (1997) 3, 348-350; Kunststoffe 88, (1998), 2, 210-212; Kunststoffe 87 (1997) 11, 1632-1640; Plastverarbeiter 50 (1999) 4, 18-19; Plastverarbeiter 46 (1995) 9, 42-46).

Precondition for the use of laser transmission welding is that the radiation emitted by the laser first penetrates a molding which has adequate transparency for laser light of the wavelength used and which in this application is hereinafter termed laser-transparent molding, and then is absorbed in a thin layer by a second molding which is in contact with the laser-transparent molding and hereinafter is called laser-absorbent molding. Within the thin layer which absorbs the laser light, the laser energy is converted into heat, and this leads to melting within the contact zone and finally to a weld which bonds the laser-transparent molding to the laser-absorbent molding.

Laser transmission welding usually uses lasers in the wavelength range from 600 to 1200 nm. Within the wavelength range of the lasers used for the thermoplastics welding, the usual lasers are Nd:YAG lasers (1064 nm) or high-power diode lasers (from 800 to 1000 nm). When the terms laser-transparent and laser-absorbent are used hereinafter, they always relate to the abovementioned wavelength range.

The laser-transparent molding, unlike the laser-absorbent molding, requires high laser transparency within the preferred wavelength range, so that the laser beam can penetrate as far as the area of the weld, with the energy level required. An example of a method used to measure capability to transmit IR laser light uses a spectrophotometer and an integrating photometer sphere. This measurement arrangement also detects the diffuse fraction of the transmitted radiation. The measurement is made not only at a single wavelength but within a spectral range which comprises all of the laser wavelengths currently used for the welding procedure.

Users presently have access to a number of laser-welding-process variants based on the transmission principle. By way of example, contour welding is a sequential welding process in which either the laser beam is conducted along a freely programmable weld contour or the component is moved relatively to the immovable laser. In the simultaneous welding process, the linear radiation emitted from individual high-power diodes is arranged along the contour of the weld. The melting and welding of the entire contour therefore take place simultaneously. The quasi-simultaneous welding process is a combination of contour welding and simultaneous welding. Galvanometric mirrors (scanners) are used to conduct the laser beam at very high velocity at 10 m/s or more along the contour of the weld. The high traverse rate provides progressive heating and melting of the region of the joint. In comparison with the simultaneous welding process, there is high flexibility for alterations in the contour of the weld. Mask welding is a process in which a linear laser beam is moved transversely across the adherends. A mask is used for controlled screening of the radiation, and this impacts the area to be joined only where welding is intended. The process can produce very precisely positioned welds. These processes are known to the person skilled in the art and are described by way of example in "Handbuch Kunststoff-Verbindungstechnik" [Handbook of plastics bonding technology] (G. W. Ehrenstein, Hanser, ISBN 3-446-22668-0) and/or DVS-Richtlinie 2243 "Laserstrahlschweißen thermoplastischer Kunststoffe" [German Welding Society Guideline 2243 "Laser welding of thermoplastics"].

Irrespective of the process variant used, the laser welding process is highly dependent on the properties of the materials of the two adherends. The degree of laser transparency (LT) of the transparent component has a direct effect on the speed of the process, through the amount of energy that can be introduced per unit of time. The inherent microstructure, mostly in the form of spherulites, of semicrystalline thermoplastics generally gives them relatively low laser transparency. These spherulites scatter the incident laser light to a greater extent than the internal structure of a purely amorphous thermoplastic: back-scattering leads to reduced total amount of transmitted energy, and diffuse (lateral) scattering often leads to broadening of the laser beam and therefore to impaired weld precision. These phenomena are particularly evident in polybutylene terephthalate (PBT), which in comparison with other thermoplastics that crystallize well, such as PA, exhibits particularly low laser transparency and a high level of beam expansion. PBT therefore continues to be comparatively little used as material for laser-welded components, although other aspects of its property profile (e.g. good dimensional stability and low water absorption) make it very attractive for applications of this type. Although semicrystalline morphology is generally unhelpful for high laser transparency, it provides advantages in terms of other properties. By way of example, semicrystalline materials continue to have mechanical strength above the glass transition point and generally have better chemicals resistance than amorphous materials. Materials that crystallize rapidly also provide processing advantages, in particular quick demoldability and therefore short cycle times. It is therefore desirable to combine semicrystallinity with rapid crystallization and high laser transparency.

There are various known approaches to laser-transparency increase in polyesters, in particular PBT. In principle, these can be divided into blends/mixtures and refractive-index matching.

The approach using blends/mixtures is based on "dilution" of the low-laser-transparency PBT by using a high-laser-transparency partner in the blend/mixture. Examples of this are found in the following specifications: JP2004/315805A1 (PBT+PC/PET/SA+filler+elastomer), DE-A1-10330722 (generalized blend of a semicrystalline thermoplastic with an amorphous thermoplastic in order to increase LT; spec. PBT+PET/PC+glass fiber), JP2008/106217A (PBT+copolymer with 1,4-cyclohexanedimethanol; LT of 16% increased to 28%). A disadvantage here is that the resultant polymer blends inevitably have properties markedly different from those of products based predominantly on PBT as matrix.

The refractive-index-matching approach is based on the different refractive indices of amorphous and crystalline PBT, and also of the fillers. By way of example, comonomers have been used here: JP2008/163167 (copolymer of PBT and siloxane), JP2007/186584 (PBT+bisphenol A diglycidyl ether) and JP2005/133087 (PBT+PC+elastomer+high-refractive-index silicone oil) may be mentioned as examples. Although this leads to an increase in laser transparency, this is achieved with loss of mechanical properties. The refractive-index difference between filler and matrix can also be reduced, see JP2009/019134 (epoxy resin coated onto glass fibers in order to provide matching at the optical interface between fiber and matrix), or JP2007/169358 (PBT with high-refractive-index glass fiber). Starting materials of this type are, however, disadvantageous because of their high costs and/or the additional stages that they require within the production process.

The effects achieved in relation to laser-transparency increase are also overall relatively minor and therefore not entirely satisfactory.

BRIEF SUMMARY OF THE INVENTION

A laser-transparent molding of any type, comprising a thermoplastic molding compositions comprising,
A) a polyester,
B) from 20 to 200 mmol/kg of polyester A) of at least one compound of the general formula (I)

where
respectively independently at any position
-$A^1$- is —NR—, —O—, —S—, —CH=$A^4$- where R is H or $C_{1-6}$-alkyl, $A^4$ is N or CH
$A^2$ is COOX or OX, where X is Li, Na, K, Rb, Cs, Mg/2, Ca/2, Sr/2, Ba/2, Al/3
$A^3$ is $C_{1-6}$-alkyl, $C_{6-12}$-aryl, $C_{7-13}$-alkaryl, $C_{7-13}$-aralkyl, O—$C_{1-6}$-alkyl, O—$C_{6-12}$-aryl, O—$C_{7-13}$-alkaryl, O—$C_{7-13}$-aralkyl, COOX', OX', SX', $SO_3$X', where X' is H or X, S—$C_{1-6}$-alkyl, S—$C_{6-12}$-aryl, $NR_2$, halogen, $NO_2$,
n is an integer from 1 to 4, and
m is an integer from 0 to 4–n, where m=1, if $A^3$=$NO_2$,
with the proviso that the number of mmol is based on the group(s) COOX and OX and SX' where X'=X, to the extent that these are present in the compound of the general formula (I); and also moreover
C) from 0 to 230% by weight of further added substances, based on the weight of component A).

The object of the present invention was therefore to improve the laser transparency of polyesters, and to provide polyesters suitable for laser transmission welding. Accordingly, the molding compositions defined in the introduction, and the use of these, were discovered. The dependent claims give preferred embodiments.

The molding compositions of the invention comprise, as component A), at least one thermoplastic polyester.

DETAILED DESCRIPTION OF THE INVENTION

At least one of the polyesters in component A) is preferably a semicrystalline polyester. Preference is given to components A) which comprise at least 50% by weight of semicrystalline polyesters. This proportion is particularly preferably at least 70% by weight (based in each case on 100% by weight of A)).

Based on 100% of the molding compositions made of A) to C) (i.e. inclusive of C)), these comprise
from 30 to 100% by weight of A)+B), preferably from 50 to 100% by weight;
from 0 to 70% by weight of C), preferably from 0 to 50% by weight.

An essential factor within the above relative magnitudes is that the proportion of component B) is always based on the polyester, since this ratio is intended to lie within the above-mentioned boundaries. The added substances C) can have an effect on laser transparency. This effect depends in essence on the scattering and absorption properties of the added substances. The optical properties of the compounded material are in essence a summation of the optical properties of the matrix of the invention (components A+B) and of those of the additives (components C).

The polyesters A) generally used are based on aromatic dicarboxylic acids and on an aliphatic or aromatic dihydroxy compound.

A first group of preferred polyesters is that of polyalkylene terephthalates having in particular from 2 to 10 carbon atoms in the alcohol moiety.

Polyalkylene terephthalates of this type are known per se and are described in the literature. Their main chain comprises an aromatic ring which derives from the aromatic dicarboxylic acid.

There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220, preferably from 80 to 160 (measured in 0.5% strength by weight solution in a phenol/o-dichlorobenzene mixture in a ratio by weight of 1:1 at 25° C.) to ISO 1628.

Particular preference is given to polyesters whose carboxy end group content is from 0 to 100 meq/kg of polyester, preferably from 10 to 50 meq/kg of polyester and in particular from 15 to 40 meq/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters, at least one being PBT. An example of the proportion of the polyethylene terephthalate in the mixture is preferably up to 50% by weight, in particular from 10 to 35% by weight, based on 100% by weight of A).

It is also advantageous, if appropriate, to use PET recyclates (also termed scrap PET) in a mixture with polyalkylene terephthalates, such as PBT.

Recyclates are Generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, more particularly mixtures of about 80% of terephthalic acid with 20% of isophthalic acid to approximately equivalent mixtures of these two acids.

The aromatic dihydroxy compounds preferably have the general formula

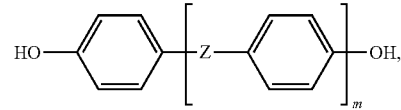

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
or a mixture of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

In the invention, the term polyester includes halogen-free polycarbonates. Examples of suitable halogen-free polycarbonates are those based on biphenols of the general formula

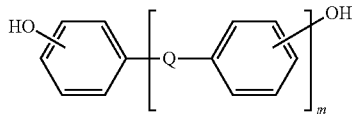

in which Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or else —O—, —S— or —SO$_2$—, and m is a whole number from 0 to 2.

The phenylene radicals of the biphenols may also have substituents, such as $C_1$-$C_6$-alkyl or $C_1$-$C_6$-alkoxy.

Examples of preferred biphenols of the formula are hydroquinone, resorcinol, 4,4'-dihydroxydiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_W$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, if appropriate, from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates with cycloalkyl radicals as monomer units have been described in EP-A 365 916.

It is also possible to replace bisphenol A with bisphenol TMC. Polycarbonates of this type are commercially available from Bayer with the trademark APEC HT®.

The molding compositions of the invention comprise, as component B), from 20 to 200 mmol/kg of polyester A), preferably from 25 to 140 mmol/kg of polyester A), in particular from 30 to 110 mmol/kg of polyester A), of at least one compound of the general formula (I).

The number of mmol of component B) here is based on the group(s) COOX and OX and SX', where X'=X in the radicals $A^2$ and optionally $A^3$ of the compounds of the general formula (I). One group COOX or, respectively, OX or, respectively, SX', where X'=X corresponds to one equivalent or mole. The data in mmol therefore gives the molar amount of groups COOX and OX and SX', where X'=X in total (i.e. the sum thereof). The number of nucleators is important for the laser transparency of the polyester. This is why the amount of the nucleator B) to be used is stated in a form based on the molar concentration salt groups, rather than in % by weight. The amounts of nucleator or nucleating agent are stated in the examples both in % by weight and in mmol/kg of polyester.

Reference can be made to DIN 32 625 of December 1998 for the determination of molar amounts using equivalents.

Reference can also be made to J. S. Fritz, G. H. Schenk, Quantitative Analytische Chemie [Quantitative Analytical Chemistry], Viehweg, 1989, pp. 8 to 9.

It is also possible that free carboxy groups (COOH) or hydroxy groups (OH), or corresponding sulfur systems, are present as radicals $A^3$ in the compounds of the general formula (I). These appear to contribute little, or nothing, to the nucleating effect, and this amount is therefore not included in the calculation for determining the mmol/kg of polyester A). In the case of partially neutralized carboxy groups or hydroxy groups, it is only the neutralized portion that is included in the calculation.

The polyesters A) generally react with the salt compounds B), whereupon the metal cation of the compounds B) is transferred to terminal carboxy groups of the polyesters. The nucleating effect of component B) is detectable even with very small concentrations. Surprisingly, laser transparency falls at very small concentrations of component B), and it is only at higher concentrations that a rise in laser transparency is achieved.

Component B) is a component selected from one or more compounds of the general formula I)

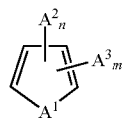

where
respectively independently at any position
-A$^1$- is —NR—, —S—, —CH=A$^4$- where R is H or C$_{1-6}$-alkyl, A$^4$ is N or CH
A$^2$ is COOX or OX, where X is Li, Na, K, Rb, Cs, Mg/2, Ca/2, Sr/2, Ba/2, Al/3
A$^3$ is C$_{1-6}$-alkyl, C$_{6-12}$-aryl, C$_{7-13}$-alkaryl, C$_{7-13}$-aralkyl, O—C$_{1-6}$-alkyl, O—C$_{6-12}$-aryl, O—C$_{7-13}$-alkaryl, O—C$_{7-13}$-aralkyl, COOX', OX', SX', SO$_3$X', where X' is H or X, S—C$_{1-6}$-alkyl, S—C$_{6-12}$-aryl, NR$_2$, halogen, NO$_2$,
n is an integer from 1 to 4, and
m is an integer from 0 to 4−n, where m=1, if A$^3$=NO$_2$,
with the proviso that the number of mmol is based on the group(s) COOX and OX and SX' where X'=X, to the extent that these groups are present in the compound of the general formula (I).

The compounds can therefore be five-membered or six-membered aromatic ring systems. The five-membered ring systems are heterocycles, but the six-membered rings can be nitrogen heterocycles or aromatic cyclic compounds comprising only carbon and therefore formally derived from benzene.

It is preferable that n in the compounds of the general formula (I) has the value 1 or 2.

It is preferable that m in the compounds of the general formula (I) has the value 0 or 1 or 2.

It is particularly preferable here that n has the value 1. It is particularly preferable that m has the value 0 or 1.

Particular preference is therefore given to combinations of n=1 with m=0, and n=1 with m=1.

X is preferably Li, Na, K, Rb, or Cs particularly Li, Na, or K, specifically Na. It is also possible that mixtures of two or more of these counterions are present.

A$^3$ is particularly preferably C$_{1-6}$-alkyl-, OX, SO$_3$X, halogen, or NO$_2$.

R in the compounds of the general formula (I) is preferably H.

The expression Mg/2, Ca/2, Sr/2, Ba/2, Al/3 means an equivalent amount of the metal or metal ion required to neutralize a COOH or OH or SH or SO$_3$H group. Since magnesium, calcium, strontium and barium are divalent, one corresponding ion is sufficient to neutralize two carboxy or hydroxy groups, or SH or SO$_3$H. One aluminum ion is sufficient to neutralize three carboxy or hydroxy groups. When said counterions are present, the amounts of the cyclic organic compounds therefore have to be doubled or tripled in order to obtain a number of metal atoms or ions that is an integer.

Preferred compounds of the general formula (I) are listed below and in the examples.

The sodium salts are preferred. The compound of the general formula (I) preferably derives from salicylic acid, benzoic acid, or phenol, where the aromatic ring can bear further substituents, but no further hydroxy or carboxy groups are present.

Examples are sodium benzoate, sodium 4-tert-butylbenzoate, disodium salicylate, sodium isonicotinate, sodium 2-thiophenecarboxylic acid, sodium pyrrole-2-carboxylate, sodium phenolate, disodium 4-hydroxybenzenesulfonate, lithium 5-sulfoisophthalate, sodium 2-nitrobenzoate, sodium 2-chlorobenzoate, sodium 2,4-dichlorobenzoate, and sodium phenylacetate.

It is preferable that all of the carboxy groups and hydroxy groups in the compounds of the general formula (I) have been neutralized.

The proportion by weight of component B) can be defined approximately as preferably from 0.3 to 2.0% by weight, particularly preferably from 0.4 to 1.5% by weight, with particular preference from 0.5 to 1% by weight, based on component A). However, the above data in mmol/kg of polyester A) is more reliable, because of the different molecular weights and equivalent weights of nucleating salt groups COOX, OX, SX', where X'=X.

The molding compositions of the invention can comprise, as component C), from 0 to 230% by weight, in particular up to 100% by weight, of further added substances and processing aids, where these differ from B) and/or from A), based on the weight of component A).

By way of example, conventional added substances C) are amounts of up to 66% by weight, preferably up to 18% by weight, of elastomeric polymers (also often termed impact modifiers, elastomers, or rubbers).

These very generally involve copolymers, which are preferably composed of at least two of the following monomers: ethylene, propylene, butadiene, isobutene, isoprene, chloroprene, vinyl acetate, styrene, acrylonitrile, and acrylates and, respectively, methacrylates having from 1 to 18 carbon atoms in the alcohol component.

Polymers of this type are described, for example, in Houben-Weyl, Methoden der organischen Chemie, Vol. 14/1 (Georg Thieme Verlag, Stuttgart, 1961), pages 392 to 406, and in the monograph by C. B. Bucknall, "Toughened Plastics" (Applied Science Publishers, London, 1977).

Some preferred types of such elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or a mixture of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I or II or III or IV

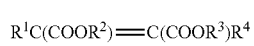 (I)

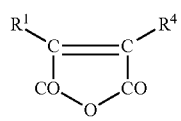 (II)

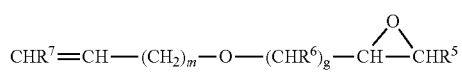 (III)

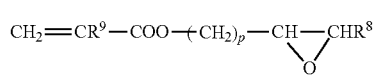 (IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may also be used are vinyl esters and vinyl ethers.

The ethylene copolymers described above may be produced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, carboxy, latent carboxy, amino and amide groups, and also functional groups which may be introduced by concomitant use of monomers of the general formula

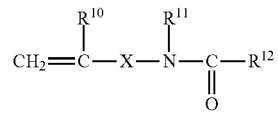

where the definitions of the substituents can be as follows:
$R^{10}$ hydrogen or a $C_1$-$C_4$-alkyl group,
$R^{11}$ hydrogen, a $C_1$-$C_8$-alkyl group or an aryl group, in particular phenyl,
$R^{12}$ hydrogen, a $C_1$-$C_{10}$-alkyl group, a $C_6$-$C_{12}$-aryl group, or —$OR^{13}$
$R^{13}$ a $C_1$-$C_8$-alkyl group or a $C_6$-$C_{12}$-aryl group, if appropriate with substitution by O— or N-containing groups,
X a chemical bond or a $C_1$-$C_{10}$-alkylene group, or a $C_6$-$C_{12}$-arylene group, or

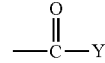

Y O—Z or NH—Z, and
Z a $C_1$-$C_{10}$-alkylene group or a $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for impact-modification of PBT, if appropriate in a mixture with up to 40% by weight of polyethylene terephthalate. Appropriate blend products are obtainable with trademark Ultradur®S (previously Ultrablend®S from BASF AG).

Instead of graft polymers whose structure has more than one shell, it is also possible to use homogeneous, i.e. single-shell, elastomers made from 1,3-butadiene, isoprene and n-butyl acrylate or from copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described can also be produced by other conventional processes, e.g. via suspension polymerization.

Preference is likewise given to silicone rubbers, as described in DE-A 37 25 576, EP-A 235 690, DE-A 38 00 603 and EP-A 319 290.

It is also possible, of course, to use a mixture of the types of rubber listed above.

Fibrous or particulate fillers C) that may be mentioned are glass fibers, glass beads, amorphous silica, asbestos, calcium silicate, calcium metasilicate, magnesium carbonate, kaolin, chalk, powdered quartz, mica, barium sulfate, and feldspar. The amounts used of fibrous fillers C) are up to 150% by weight, in particular up to 50% by weight, and the amounts used of particulate fillers are up to 45% by weight, in particular up to 10% by weight, based on the amount of component A).

Preferred fibrous fillers that may be mentioned are aramid fibers and potassium titanate fibers, and particular preference is given here to glass fibers in the form of E glass. These can be used in the form of rovings or of chopped glass in the forms commercially obtainable.

The amounts used of fillers that have high laser absorbency, for example carbon fibers, carbon black, graphite, graphene, or carbon nanotubes, are preferably below 1% by weight, particularly preferably below 0.05% by weight, based on the amount of component A).

The fibrous fillers can have been surface-pretreated with a silane compound in order to improve compatibility with the thermoplastic.

Suitable silane compounds are those of the general formula

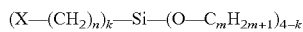

where the definitions of the substituents are as follows:
X NH$_2$—,

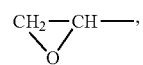

HO—,
n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used for surface coating of the silane compounds are from 0.05 to 5% by weight, preferably from 0.1 to 1.5% by weight, and in particular 0.2 to 0.5% by weight (based on C).

Acicular Mineral Fillers are Also Suitable.

For the purposes of the invention, acicular mineral fillers are a mineral filler with pronounced acicular character. An example that may be mentioned is acicular wollastonite. The L/D (length to diameter) ratio of the mineral is preferably from 8:1 to 35:1, with preference from 8:1 to 11:1. The mineral filler can, if appropriate, have been pretreated with the abovementioned silane compounds; however, the pretreatment is not essential.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, plasticizers, etc.

Examples of oxidation retarders and heat stabilizers are sterically hindered phenols and/or phosphites, hydroquinones, aromatic secondary amines, such as diphenylamines, and various substituted representatives of these groups, and mixtures of these, at concentrations of up to 1% by weight, based on the weight of the thermoplastic molding compositions.

UV stabilizers that may be mentioned, generally used in amounts of up to 2% by weight, based on the molding composition, are various substituted resorcinols, salicylates, benzotriazoles, and benzophenones.

Colorants that can be added comprise inorganic and organic pigments, and also dyes, such as nigrosin, and anthraquinones. Particularly suitable colorants are mentioned by way of example in EP 1722984 B1, EP 1353986 B1, or DE 10054859 A1.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be monobasic or dibasic. Examples that may be mentioned are pelargonic acid, palmitic acid, lauric acid, margaric acid, dodecanedioic acid, behenic acid, and with particular preference stearic acid, and capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono- to trifunctional. Examples of these are stearylamine, ethylenediamine, propylenediamine, hexamethylenediamine, and di(6-aminohexyl) amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or esters combined with amides, in any desired mixing ratio.

The amounts usually used of further lubricants and mold-release agents are usually up to 1% by weight, based on the amount of component A). It is preferable to use long-chain fatty acids (e.g. stearic acid or behenic acid), salts of these (e.g. Ca stearate or Zn stearate), or montan waxes (mixtures made of straight-chain, saturated carboxylic acids having chain lengths of from 28 to 32 carbon atoms), or else Ca montanate or Na montanate, or else low-molecular-weight polyethylene waxes or low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers, based on the amount of component A). These are polymers of ethylene having fluorine content of from 55 to 76% by weight, preferably from 70 to 76% by weight.

Examples here are polytetrafluoroethylene (PTFE), tetrafluoroethylene-hexafluoropropylene copolymers, or tetrafluoroethylene copolymers having relatively small proportions (generally up to 50% by weight) of copolymerizable ethylenically unsaturated monomers. These are described by way of example by Schildknecht in "Vinyl and Related Polymers", Wiley-Verlag, 1952, pages 484 to 494, and by Wall in "Fluoropolymers" (Wiley Interscience, 1972).

These fluorine-containing ethylene polymers have homogeneous distribution in the molding compositions and preferably have a (number-average) $d_{50}$ particle size in the range from 0.05 to 10 μm, in particular from 0.1 to 5 μm. These small particle sizes can be particularly preferably achieved via use of aqueous dispersions of fluorine-containing ethylene polymers and incorporation of these into a polyester melt.

The thermoplastic molding compositions of the invention can be produced by processes known per se, by mixing the starting components in conventional mixing apparatuses, such as screw extruders, Brabender mixers, or Banbury mixers, and then extruding the same. The extrudate can be cooled and comminuted. It is also possible to premix individual components (e.g. applying component B) to the pellets, for example in a drum), then adding the remaining starting materials individually and/or after they have been likewise mixed. The mixing temperatures are generally from 230 to 290° C. Component B) can also preferably be added to the extruder inlet by the hot-feed or direct method.

In another preferred method of operation, components B) and also, if appropriate, C) can be mixed with a polyester prepolymer, and compounded and pelletized. The resultant pellets are then solid-phase condensed under inert gas continuously or batchwise at a temperature below the melting point of component A) until the desired viscosity has been reached.

The molding compositions that can be used in the invention are suitable for producing laser-transparent moldings. The laser transparency of these is preferably at least 33%, in particular at least 40%, specifically at least 50% (at 1064 nm, measured on moldings of thickness 2 mm by the test method described in the examples).

Laser-transparent moldings of this type are used in the invention to produce moldings by means of laser transmission welding processes.

The use preferably serves for producing moldings via laser transmission welding. Laser transmission welding is preferably used here to bond the laser-transparent moldings to laser-absorbent moldings.

Moldings made of any laser-absorbent materials can generally be used as laser-absorbent molding. By way of example, composite materials or thermosets can be used here, or preferably moldings made from specific thermoplastic molding compositions. Suitable thermoplastic molding compositions are molding compositions which have adequate laser absorption within the wavelength range used. Suitable thermoplastic molding compositions can by way of example preferably be thermoplastics which are laser-absorbent by virtue of addition of inorganic pigments, such as carbon black, and/or by virtue of addition of organic pigments or of other additives. Examples of suitable organic pigments for achieving laser absorption are preferably IR-absorbent organic compounds, for example those described in DE 199 16 104 A1.

The invention further provides moldings and/or molding combinations, to which moldings of the invention have been bonded by laser transmission welding.

Moldings of the invention have excellent suitability for durable and stable attachment to laser-absorbent moldings by the laser transmission welding process. They are therefore particularly suitable for materials for covers, housings, add-on components, and sensors, for example for applications in the motor-vehicle, electronics, telecommunications, information-technology, computer, household, sports, medical, or entertainment sector.

EXAMPLES

Component A/1:

Polybutylene terephthalate with intrinsic viscosity 130 ml/g and having terminal carboxy group content of 34 meq/kg (Ultradur® B 4500 from BASF SE) (IV measured in 0.5 strength by % solution of phenol/o-dichlorobenzene, 1:1 mixture, at 25° C.).

Component B)

| E1 | Sodium benzoate |
| E2 | Sodium 4-tert-butylbenzoate |
| E3 | Disodium salicylate |
| E4 | Disodium 4-hydroxybenzenesulfonate |
| E5 | Lithium 5-sulfoisophthalate |
| E6 | Sodium 2-nitrobenzoate |
| E7 | Sodium 2-chlorobenzoate |
| E8 | Sodium 2,4-dichlorobenzoate |
| E9 | Sodium phenylacetate |
| E10 | Sodium isonicotinate |
| E11 | Sodium 2-thiophenecarboxylic acid |
| E12 | Sodium pyrrole-2-carboxylate |
| E13 | Sodium phenolate |

Component C

Glass fibers: diameter 10 μm, sized for polyester, DS3185 from 3B.

The molding compositions were produced in a ZSK25 at from 250 to 260° C., flat temperature profile, and pelletization.

Laser Transparency Measurement

Laser transmittance was determined at wavelength 1064 nm means of thermoelectric power measurement. The measurement geometry was set up as follows: a beam divider (SQ2 non-polarizing beam divider from Laseroptik GmbH) was used to divide a reference beam of power 1 watt at an angle of 90° from a laser beam (diode-pumped Nd—YAG laser with wavelength 1064 nm, FOBA DP50) with total power of 2 watts. The reference beam impacted the reference sensor. That portion of the original beam that passed through the beam divider provides the measurement beam likewise with power of 1 watt. This beam was focused to a focal diameter of 0.18 μm via a mode diaphragm (5.0) behind the beam divider. The laser transparency (LT) measurement sensor was positioned 80 mm below the focus. The test sheet was positioned 2 mm above the LT measurement sensor. Injection-molded test sheets are used, with dimensions 60*60*2 mm$^3$ and with edge gating. The measurement was made in the middle of the sheet (point of intersection of the two diagonals). The injection-molding parameters were set to the following values:

| | Melt temp. [° C.] | Mold temp. [° C.] | Injection rate [cm$^3$/s] | Hold pressure [bar] |
|---|---|---|---|---|
| Unreinforced materials | 260 | 60 | 48 | 600 |
| Reinforced materials | 260 | 80 | 48 | 600 |

The total measurement time was 30 s, and the result of the measurement is determined within the final 5 s. The signals from the reference sensor and measurement sensor were recorded simultaneously. The measurement process begins with insertion of the specimen. Transmittance, and therefore laser transparency, was obtained from the following formula:

LT=(Signal(measurement sensor)/Signal(reference sensor))×100%.

This measurement method excluded variations in the laser system and subjective read-out errors.

The average LT value for a sheet was calculated from at least five measurements. For each material, the average value was calculated on 10 sheets. The average values from the measurements on the individual sheets were used to calculate the average value, and also the standard deviation, for the material.

Transmittance Spectra (Ulbricht Measurement)

Transmission spectra were measured using Ulbricht sphere measurement geometry in the wavelength range from 300 to 2500 nm. Ulbricht spheres are hollow spheres, the inner surfaces of which provide high and unoriented (diffuse) reflection over a broad spectral range. When radiation impacts the inner surface of the sphere, it undergoes multiple reflection until it has completely uniform distribution within the sphere. This integration of the radiation averages all of the effects due to angle of incidence, shadowing, modes, polarization, and other properties. As a function of the configuration of the Ulbricht sphere, the detector attached within the sphere records only diffuse transmittance, or the sum of directed and diffuse transmittance (=total transmittance).

A Varian Cary 5000 spectrometer with attached DRA 2500 Ulbricht system was used in transmission mode (specimen between radiation source and Ulbricht sphere). To measure total transmittance, a white reflector (Labsphere Spectralon Standard) was used to close the reflection port opposite to the specimen. To measure the diffuse transmittance fraction, a black light trap (DRA 2500 standard light trap) was used to close the reflection port. Transmittance was stated in relation to the intensity of incident radiation. Oriented transmittance was calculated as the difference between total transmittance and diffuse transmittance. Oriented transmittance is stated in relation to total transmittance:

$$\text{Oriented transmittance} = \frac{(\text{total transmittance} - \text{diffuse transmittance}) \times 100\%}{\text{total transmittance}}$$

TABLE 1

| Component | Amount of B [% by wt.] | Amount of B [mmol/kg of PBT] | LT @ 1064 nm [% T] |
|---|---|---|---|
| Reference | 0 | 0 | 30 |
| E1 | 0.5 | 34.7 | 55 |
| E2 | 0.5 | 25.0 | 42 |
| E3 | 0.5 | 27.05 | 61 |
| E4 | 0.5 | 22.9 | 36 |
| E5 | 0.5 | 19.8 | 35 |
| E6 | 0.5 | 26.4 | 41 |
| E7 | 0.5 | 31.9 | 43 |
| E8 | 0.5 | 23.5 | 39 |
| E9 | 0.5 | 31.6 | 49 |
| E10 | 0.5 | 34.5 | 51 |
| E11 | 0.5 | 33.3 | 45 |
| E12 | 0.5 | 37.6 | 60 |
| E13 | 0.5 | 43.1 | 51 |

TABLE 2

Mechanical properties of selected unreinforced formulations:

| | | 100% by weight of A/1 reference | 99.5% of A/1 + 0.5% of B1 |
|---|---|---|---|
| Modulus of elasticity | [MPa] | 2511 | 2882 |
| Tensile strength | [MPa] | 56.4 | 57.2 |
| Tensile strain at break | [%] | 170 | 2.4 |
| Impact resistance without notch | [kJ/m^2] | no fracture | 31.3 |

Tensile test to ISO 527. Impact resistance test to ISO 179.

TABLE 3

| Component | Amount of B [% by wt.] | Amount of B [mmol/kg of PBT] | LT @ 1064 nm [% T] |
|---|---|---|---|
| Reference | | 0 | 30 |
| E1 | 0.01 | 0.7 | 30 |
| E1 | 0.1 | 6.9 | 25 |
| E1 | 0.2 | 13.9 | 30 |
| E1 | 0.3 | 20.8 | 41 |
| E1 | 0.4 | 27.8 | 47 |
| E1 | 0.5 | 34.7 | 50 |
| E1 | 0.75 | 52.0 | 56 |
| E1 | 1 | 69.4 | 58 |
| E1 | 1.5 | 104.1 | 55 |
| E1 | 2 | 138.8 | 44 |

TABLE 4

Ulbricht transmittance measurements on selected formulations:

| Wavelength range [nm] | Total transmittance [%] Reference | Total transmittance [%] 99.5% of A/1 0.5% by wt. of B1 | Oriented transmittance fraction [%] Reference | Oriented transmittance fraction [%] 99.5% of A/1 0.5% by wt. of B1 |
|---|---|---|---|---|
| 400-600 | 10-20 | 2-24 | 0-2 | 0-2 |
| 600-800 | 20-27 | 24-37 | 0-2 | 0-4 |
| 800-1000 | 27-30 | 37-46 | 0-2 | 4-27 |
| 1000-1100 | 30-32 | 46-50 | 0-2 | 27-43 |
| 1100-1200 | abs | abs | 0-2 | 43-64 |
| 1200-1600 | 18-33 | 45-67 | 0-2 | 62-90 |
| 1600-1630 | 20-30 | 60-66 | 0-5 | 90-92 |
| 1630-1800 | abs | abs | 0-5 | 92-95 |
| 1800-2100 | 7-14 | 51-59 | 0-2 | 95-97 |
| 2100-2200 | abs | abs | 0-5 | 97-98 | abs: absorption-dependent transparency change (band)

TABLE 5

Concentration series, reinforced (in B4500 + 30% by weight of glass fibers)

| Component | Amount of B [% by wt.] | Amount of B [mmol/kg of PBT] | LT @ 1064 nm [% T] |
|---|---|---|---|
| Reference | 0 | 0 | 27 |
| E1 | 0.01 | 0.9 | 27 |
| E1 | 0.1 | 9.2 | 18 |
| E1 | 0.3 | 27.7 | 36 |
| E1 | 0.5 | 46.1 | 47 |
| E1 | 0.75 | 69.2 | 52 |

TABLE 6

Mechanical properties of selected reinforce formulations:

| | | Reference | +0.5% of B1 |
|---|---|---|---|
| Modulus of elasticity | [MPa] | 9564 | 10 485 |
| Tensile strength | [MPa] | 136 | 140 |
| Tensile strain at break | [%] | 3.4 | 2.2 |
| Impact resistance with notch | [kJ/m²] | 9.8 | 8.1 |

Reference: 70% by weight of A/1 + 30% by weight of C

The invention claimed is:

1. A laser-transparent molding comprising a thermoplastic molding composition comprising,
A) a polyester,
B) from 20 to 200 mmol/kg of polyester A) of at least one compound selected from the group consisting of sodium isonicotinate, sodium 2-thiophenecarboxylic acid, sodium pyrrole-2-carboxylate, sodium phenolate and sodium phenylacetate, and
C) from 0 to 230% by weight of further added substances, based on the weight of component A).

2. The molding according to claim 1, where the molding composition comprises from 25 to 140 mmol/kg of polyester A of component B).

3. The molding according to claim 1, where the laser transparency (LT) of the molding is at least 33% (measured at 1064 nm on a molding of thickness 2 mm) based on the formula:

LT=(Signal(measurement sensor)/Signal(reference sensor))×100%.

4. The molding according to claim 1, wherein X is Li, Na, K, Rb or Cs.

5. The molding according to claim 4, wherein X is Li, Na or K.

6. The molding according to claim 1 obtained via laser transmission welding.

7. The moldings according to claim 1, wherein laser transmission welding is used to bond the laser-transparent moldings to laser-absorbent moldings.

* * * * *